US006816816B2

(12) United States Patent
Slates et al.

(10) Patent No.: US 6,816,816 B2
(45) Date of Patent: Nov. 9, 2004

(54) TRANSDUCER FAULT DETECTION SYSTEM USING SLEW RATE MEASUREMENTS: APPARATUS AND METHOD

(75) Inventors: Richard D. Slates, Minden, NV (US); Ingrid M. Foster, Carson City, NV (US); Roger G. Harker, Minden, NV (US)

(73) Assignee: Bently Nevada, LLC, Minden, NV (US)

( * ) Notice: Subject to any disclaimer, the term of this patent is extended or adjusted under 35 U.S.C. 154(b) by 9 days.

(21) Appl. No.: 10/365,802

(22) Filed: Feb. 12, 2003

(65) Prior Publication Data

US 2004/0158435 A1 Aug. 12, 2004

(51) Int. Cl.[7] ................................................ G06F 11/30
(52) U.S. Cl. ...................................... 702/185; 702/182
(58) Field of Search .............................. 324/500, 511; 702/116, 182, 183, 185, 109

(56) References Cited

U.S. PATENT DOCUMENTS

| | | | |
|---|---|---|---|
| 4,193,028 A | | 3/1980 | Downs, II |
| 4,337,516 A | * | 6/1982 | Murphy et al. ............. 702/183 |
| 4,972,145 A | | 11/1990 | Wood et al. |
| 4,974,214 A | | 11/1990 | Forster et al. |
| 5,130,933 A | | 7/1992 | Kitano |
| 5,317,258 A | | 5/1994 | Setzer et al. |
| 5,343,145 A | | 8/1994 | Wellman et al. |
| 5,359,238 A | | 10/1994 | Lesko |
| 5,394,035 A | | 2/1995 | Elwell |
| 5,394,084 A | | 2/1995 | Snyder |
| 5,397,967 A | | 3/1995 | Carobolante et al. |
| 5,493,214 A | | 2/1996 | Good et al. |
| 5,661,383 A | | 8/1997 | Schlager et al. |
| 5,777,468 A | | 7/1998 | Maher |
| 5,808,489 A | | 9/1998 | Johnson |
| 5,877,647 A | * | 3/1999 | Vajapey et al. ............. 327/391 |
| 5,986,489 A | * | 11/1999 | Raza et al. .................. 327/170 |
| 6,160,416 A | * | 12/2000 | Adduci et al. ................ 326/21 |

OTHER PUBLICATIONS

Calvano, J; Alves, V; Lubaszewski, M; "Testing a PWM Circuit Using Functional Fault Models and Compact Test Vectors for Operational Amplifiers"; Proceedings 9th Asian Test Symposium; Dec. 4–6, 2000; pp 96–10.*

* cited by examiner

*Primary Examiner*—John Barlow
*Assistant Examiner*—Douglas N Washburn
(74) *Attorney, Agent, or Firm*—Dennis A. DeBoo

(57) ABSTRACT

A transducer fault detection system that transforms transducer measurements into slew rate measurement, and determines which, if any, of the slew rate measurement are anomalous or correlative to faults. The system can generate alarms based on these determinations. The system may also transform transducer measurements into digitized voltage measurements, determine how long a succession of the digitized voltage measurements remain within at least one defined voltage window, and determine if there is a correlation between the determined time duration of digitized voltage measurements and an anomalous condition. Each determined anomalous condition may then be associated to a defined fault for gaining fault specificity.

16 Claims, 7 Drawing Sheets

| Transducer/Sensor Faults | Fault Slew Rates Target Far (V/usec) | Fault Slew Rates Target Near (V/usec) |
|---|---|---|
| Field Wiring: opening -Vt | 0.30 0.009 volts static measurement | 0.30 0.009 volts static measurement |
| Field Wiring: opening prox Out | 0.35 0.009 volts static measurement | 0.18 0.009 volts static measurement |
| Field Wiring: opening Com At Transducer | -0.03 -20.93 volts static measurement | -0.03 -20.93 volts static measurement |
| Field Wiring: shorting prox Out | 2.00 0.002 volts static measurement | 2.00 0.002 volts static measurement |
| Transducer: shorting probe | 1.72 -0.46 volts static measurement | 0.80 -0.46 volts static measurement |
| Transducer: opening conductor on probe | 0.5 -0.46 volts static measurement | -1.40 -0.46 volts static measurement |
| Field Wiring: close opened -Vt | -4.00 | -4.00 |
| Field Wiring: close opened prox Out | -4.60 | -4.20 |
| Field Wiring: close opened Com At Transducer | -1.00, | -1.00, |
| Field Wiring: unshort prox Out | -4.00 | -4.00 |
| Transducer: unshort probe | -0.78 | -0.28 |
| Transducer: Closing conductor on probe | -2.50 | -2.0 |
| Approaching target | 2.00 and 1.20 | 0.7 |
| Retreating target | -0.40 | -0.30 |

Figure 5

TRANSDUCER FAULT DETECTION SYSTEM USING SLEW RATE MEASUREMENTS: APPARATUS AND METHOD

BACKGROUND OF THE INVENTION

This invention relates generally to a transducer fault detection system and, in particular, to a transducer fault detection apparatus and method for detecting anomalies in transducer output signals.

As is well known in the art, machinery protection systems are designed to accept a variety of transducer inputs and to monitor and display appropriate machinery parameters. Alarms are generated when conditions exceed user-established limits. These alarms can be used to automatically shut down the machine and/or to annunciate machinery problems to operators and other plant personnel. Additionally, these systems have incorporated monitoring features for minimizing the possibility of false alarms caused by, for example, a defective transducer, its associated interconnects and interconnect wiring, or transducer power supply.

One currently used detection scheme for censoring transducers is known as a "NOT OK" detection scheme which is accomplished by reading a transducer voltage signal and checking to see if it exceeds a predefined limit or goes outside a predefined voltage window having an upper and a lower limit or range. If the voltage signal exceeds the predefined limit or goes outside the predefined voltage window the signal is deemed not ok or anomalous and alarming off the transducer may be defeated thereby eliminating the possibility of false alarms caused by the transducer being defective, its associated interconnects and interconnect wiring being defective, or the transducer power supply being defective.

However, alarm conditions are missed any time anomalies in transducer output signals do not exceed the predefined limit or do not go outside the predefined window, Additionally, there is a lack of specificity on the root cause of transducer signals that are determined as "NOT OK" or anomalous.

Hence, there is a need for providing improved systems for censoring transducers for solve the problem of missing alarm conditions by missing anomalies in transducer output signals. Particularly, there is a need for solving the problem of missing alarm conditions by missing anomalies in transducer output signals that do exceed a predefined limit or do not go outside a predefined window. Additionally, there is a need for providing more specificity on the problem causing a "NOT OK" or anomalous transducer signal so that the causation of the problem can be quickly resolved and alarming off the transducer can be quickly restored if defeated.

SUMMARY OF THE INVENTION

The present invention is distinguished over the known prior art in a multiplicity of ways. In one aspect of the invention, a transducer fault detection system is provided that transforms transducer measurements into slew rate measurements, determines which, if any, of the slew rate measurements are anomalous or correlative to transducer faults, and generates alarms based on these determinations for annunciating faults to personnel and/or for defeating the transducer for eliminating the possibility of false alarms caused by faults such as transducer defects, transducer interconnect defects, transducer interconnect wiring defects, and/or transducer power supply defects. In particular, this aspect of the invention provides a transducer fault detection system that transforms transducer measurements into slew rate measurements, determines which, if any, of the slew rate measurements arc faster than that which could be due to a moving target being monitored by the transducer, and generates alarms based on whether or not any of the determined faster slew rate measurements are correlative to fault conditions.

Hence, a transducer fault detection system is provided that solves the problem of, inter alia, missing alarm conditions by missing anomalies in a transducer output signal such as that caused by an anomalous transducer output signal that does not exceed a predefined limit or that does not go outside a predefined window having an upper and a lower limit or range.

Additionally, the transducer fault detection system may correlate determined anomalous slew rate measurements to specific transducer faults so that the causation of the problem can be quickly resolved and alarming off the transducer can be quickly restored if defeated.

Furthermore, another aspect the invention provides a transducer fault detection system that transforms transducer signals or measurements into digitized voltage measurements and determines how long a succession of digitized voltage measurements remain within at least one defined voltage window or remain at, above, or below at least one defined voltage value for determining if there is a correlation between a measured time duration of digitized voltage measurements and a "Not Ok" or anomalous condition. Each determined "Not Ok" or anomalous condition can then be associated to a defined fault for gaining fault specificity on determined "Not Ok" or anomalous transducer measurements so that the causation of the problem can be quickly resolved and alarming off the transducer can be quickly restored if defeated.

In one embodiment of the invention, a method for detecting faults from a transducer output signal includes the steps of: monitoring a slew rate of a transducer output signal; comparing the slew rate with a known value; correlating the slew rate to a fault when indicated by the comparison step.

In another embodiment of the invention, a transducer fault detection device comprises, in combination: at least one transducer outputting transducer measurements correlative to movement of a target of a mechanical system being monitored by said transducer; means, operatively coupled to the transducer, for transforming the transducer measurements into slew rate measurements; means for determining which, if any, of said slew rate measurements are faster than that which could be due to the moving target being monitored by said transducer; and means for ascertaining whether or not any of said determined faster slew rate measurements are correlative to transducer faults for providing fault detection.

In another embodiment of the invention, a method for detecting transducer faults includes the steps of transforming transducer measurements made by a transducer monitoring a moving target of a mechanical system into slew rate measurements; comparing the slew rate measurements to at least one previously known slew rate value which is known to be faster than that which could be due to the moving target of the mechanical system for determining which if any of the slew rate measurements are faster than the at least one previously known slew rate value, and correlating those slew rate measurements that are determined to be faster than the at least one previously known slew rate value to at least one transducer fault wherein each correlated slew rate measurement is characterized by having a faster slew rate than that which could be due to the moving target of the mechanical system.

In another embodiment of the invention, a method for detecting faults from a transducer output signal includes the steps of: transforming transducer signals into digitized voltage measurements; determining a time duration of how long a succession of the digitized voltage measurements remain within at least one defined voltage window; determining if the succession of the digitized voltage measurements remaining within at least the one defined voltage window for the determined time duration is correlative to an anomalous condition, and associating each determined anomalous condition to at least one defined fault for gaining fault specificity for providing mechanical system protection.

Moreover, having thus summarized the invention, it should be apparent that numerous modifications and adaptations may be resorted to without departing from the scope and fair meaning of the invention as set forth hereinbelow by the claims.

BRIEF DESCRIPTION OF THE DRAWINGS

FIG. 5 is a table view of various transducer or sensor faults and associated slew rate and static values.

DETAILED DESCRIPTION OF THE INVENTION

Figure 1:
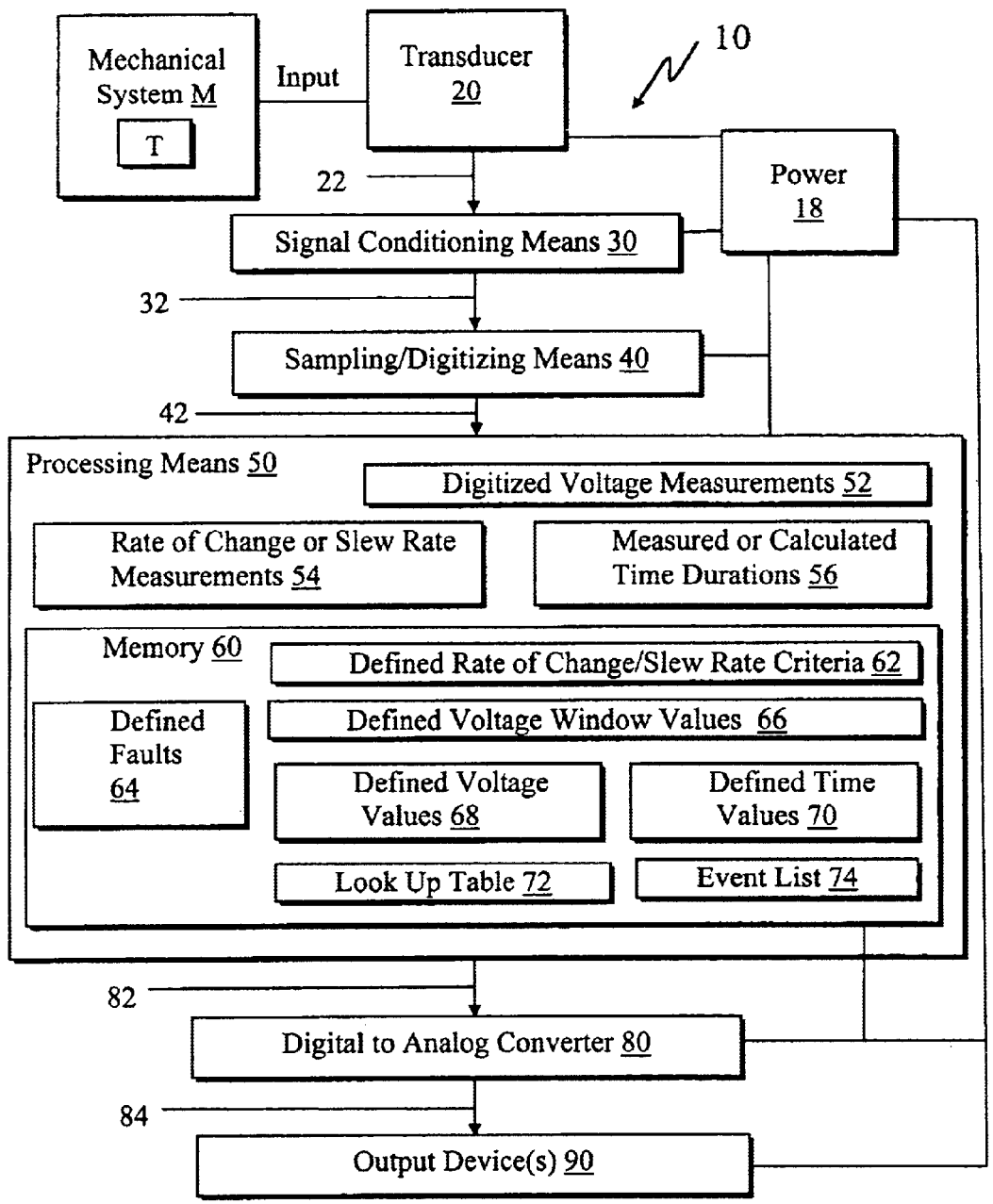
FIG. 1 is a functional block diagram of a transducer fault detection system.

Considering the drawings, wherein like reference numerals denote like parts throughout the various drawing figures, reference numeral 10 is directed to the transducer fault detection system.

In its essence, and in one aspect of the invention, a transducer fault detection system 10 is provided that transforms transducer measurements into slew rate measurements, determines which, if any, of the slew rate measurements are anomalous or correlative to transducer faults by, for example, determining which, if any, of the slew rate measurements are faster than that which could be due to a moving target being monitored by the transducer, and then generates alarms based on these determinations for annunciating faults to personnel and/or for defeating the transducer for eliminating the possibility of false alarms caused by faults such as transducer defects, transducer interconnect defects, transducer interconnect wiring defects, and/or transducer power supply defects. Furthermore, and in another aspect of the invention, a transducer fault detection system 10 is provided that transforms transducer signals or measurements into digitized voltage measurements and determines how long a succession of digitized voltage measurements remain within at least one defined voltage window or remain at, above, or below at least one defined voltage value for determining if there is a correlation between a measured time duration of digitized voltage measurements and a "Not Ok" or anomalous condition. Each determined "Not Ok" or anomalous condition can then be associated to a defined fault for gaining fault specificity on determined "Not Ok" or anomalous transducer measurements so that the causation of the problem can be quickly resolved and alarming off the transducer can be quickly restored if defeated.

Specifically, and referring to the drawings, an embodiment of the invention provides a transducer fault detection system 10 comprised of at least one transducer 20 outputting an electrical signal or transducer measurement correlative to movement of a target T of a mechanical system M being monitored by the transducer 20. The system 10 is further comprised of a conditioning means or circuit 30, a sampling means 40, and a processing means 50 operatively coupled to the transducer 20 for, respectively, receiving and conditioning the electrical signal, sampling and digitizing the conditioned electrical signal, and then calculating rates of change or slew rates 54 of the electrical signal from the sampled and digitized signal thereby transforming transducer measurements into rate of change or slew rate measurements 54. Next, the system 10 determines which, if any, of the calculations or transformations meet a defined criterion 62 such as having a measured rate of change or slew rate which is faster than that which could be due to the moving target T for providing a means for censoring transducers 20 for defined faults 64 comprised of transducer defects, interconnect defects, interconnect wiring defects, and transducer power supply defects.

Furthermore, an embodiment of the invention provides a provides a transducer fault detection system 10 that transforms transducer signals or measurements into sampled and digitized voltage measurements 52 and correlates these measurements to defined faults 64 by determining if the digitized voltage measurements 52 are within at least one defined voltage window 66 or by determining if the digitized voltage measurements 52 are at, above, or below at least one defined voltage value 68 and then employing this information along with at least one measured or calculated duration of time 56 that the voltage measurements remain in the defined voltage window 66 or remain at, above, or below at least one defined voltage value 68 for determining which, if any, of the digitized voltage measurements 52 and thus, the transducer measurements, are correlative to a "Not Ok" or anomalous condition. The system 10 can then associate each determined "Not Ok" or anomalous condition to at least one defined fault 64 for gaining fault specificity on each determined "Not Ok" or anomalous transducer measurement.

More specifically, and referring to FIG. 1, the transducer fault detection system 10 is comprised of at least one sensor or transducer 20 disposed to monitor movement or position of the target T (e.g., a rotating shaft, a rolling element bearing, or a piston rod) of the mechanical system M (e.g., a rotating or reciprocating machine). The transducer 20 outputs an electrical signal, such as a voltage signal, to the signal conditioning means or circuit 30 via connection 22. The signal conditioning circuit 30 conditions the electrical signal received from the transducer 30. Examples of sensor or transducer 20, connection (interconnects and wiring) 22 and signal conditioning circuit 30 are sold by the assignee of the present patent application, Bently Nevada, LLC of Minden, Nev., USA, some of which are sold under the names 7200 and 3300 Proximity Transducer Systems.

In turn, the signal conditioning circuit 30 outputs the conditioned electrical signal, via connection 32, to a sampling means 40 such as an analog to digital converter which samples and digitizes the conditioned electrical signal into a digitally measured signal such as a digitally measured voltage signal.

The sampling means 40 is connected, via connection 42, to the processing means or processor 50. The processor 50 can output, inter alia, a control signal to the sampling means 40 for sampling the conditioned electrical signal at, for example, a known sampling rate. In turn, the processor 50 receives the digitally measured signal (e.g., the digitized voltage measurements 52) via connection 42 for further processing by the processor 50.

The processor 50 is operatively coupled to an associated memory 60 and provides the means for calculating rate of change or slew rate measurements 54 from one sample to another (e.g., calculating the rate of change or slew rate between any two or more samples including between two or more consecutive samples) by taking a difference in amplitude or magnitude (e.g., the amplitude or magnitude value of digitized voltage measurement 52) between any two or more samples and dividing the difference by a period or increment of time it takes to go between any two or more samples (e.g., the known sample rate or a measured or calculated time duration 56) for transforming transducer measurements (electrical signal output of the transducer 20) into calculated or determined rate of change or slew rate measurements 54. The processor 50 and the associated memory 60 can be implemented by, for example, a computer or monitor programmed as delineated herein.

The processor 50 also provides the means for comparing the calculated rate of change or slew rate measurements or values 54 to at least one defined or known rate of change or slew rate criterion or value 62 stored in memory 60 for determining which, if any, of the calculated rate of change or slew rate measurements 54 and thus, the transducer outputs, are correlative to a "Not Ok" or anomalous condition. In one preferred form, the criterion or value 62 is correlative to at least one rate of change or slew rate value which is faster than that which could be due to the moving target T of the mechanical system M being monitored by the transducer 20. Additionally, the processor 50 provides the means for correlating the measured or calculated rate of change or slew rate measurements which meet or exceed at least one defined or known rate of change or slew rate criterion or value 62 to one or more defined faults 64 for providing a means for determining a "Not Ok" or anomalous condition and thus, censoring transducers for faults such as, inter alia, transducer defects, interconnect defects, interconnect wiring defects, and transducer power supply defects. The determining step can be used to associate each determined "Not Ok" or anomalous condition to a specific defined fault 64 for gaining fault specificity on each determined "Not Ok" or anomalous transducer measurement.

Furthermore, the processor 50 can provide the means for tagging those rate of change or slew rate measurements 54 which meet or exceed at least one defined rate of change or known slew rate criterion or value 62 as anomalous measurements and for correlating the anomalous measurements to specific defined faults 64 for generating alarms or defeating or not alarming off the transducer. Additionally, any measurement which is determined to be faster than that which could be due to the moving target and/or meets at least one additional criterion can be, inter alia, correlated to one or more particular transducer faults, logged as an event in an event list 74, stored in memory, used to generate an alarm and/or used to minimize the possibility of false alarms by defeating or not alarming off the transducer which has produced the measurement which is determined to be faster than that which could be due to the moving target and/or meets the at least one additional criterion.

Additionally, the processor 50 can provide the means for associating a "Not Ok" or anomalous condition to a specific defined fault by employing a look up table 72 which can correlate particular rate of change or slew rate values to particular transducer faults such as, inter alia, transducer defects, interconnect defects, interconnect wiring defects, and transducer power supply defects. The defined faults 64 and the look up table 72 could also include the known positive and negative rate of change and/or slew rate measurements or values which are faster than that which could be due to moving targets T of mechanical systems M, such as rotating or reciprocating machines, being monitored by one or more transducers 20.

The processor 50 can be operatively coupled to a digital to analog converter 80 via connection 82 or to a computer 160 via connection 162 (FIG. 4) for providing the means for receiving and conveying information, via connection 84, to physical output devices 90 such as alarms, or such as relay outputs, current output such as 4–20 mA outputs, and communication links between processor 50 and other external platforms for, inter alia, generating alarms based on determined "Not Ok" or anomalous conditions and using these alarms to automatically shut down the machine M being monitored by the transducer 20 and/or automatically annunciate machinery problems to operators and other plant personnel.

As is required, a power supply 18 can be operatively coupled to transducer 20, signal conditioning means 30, sampling/digitizing means 40, processor 50, memory 60, digital to analog converter 80, and output devices 90 for providing power as needed.

Figure 2:
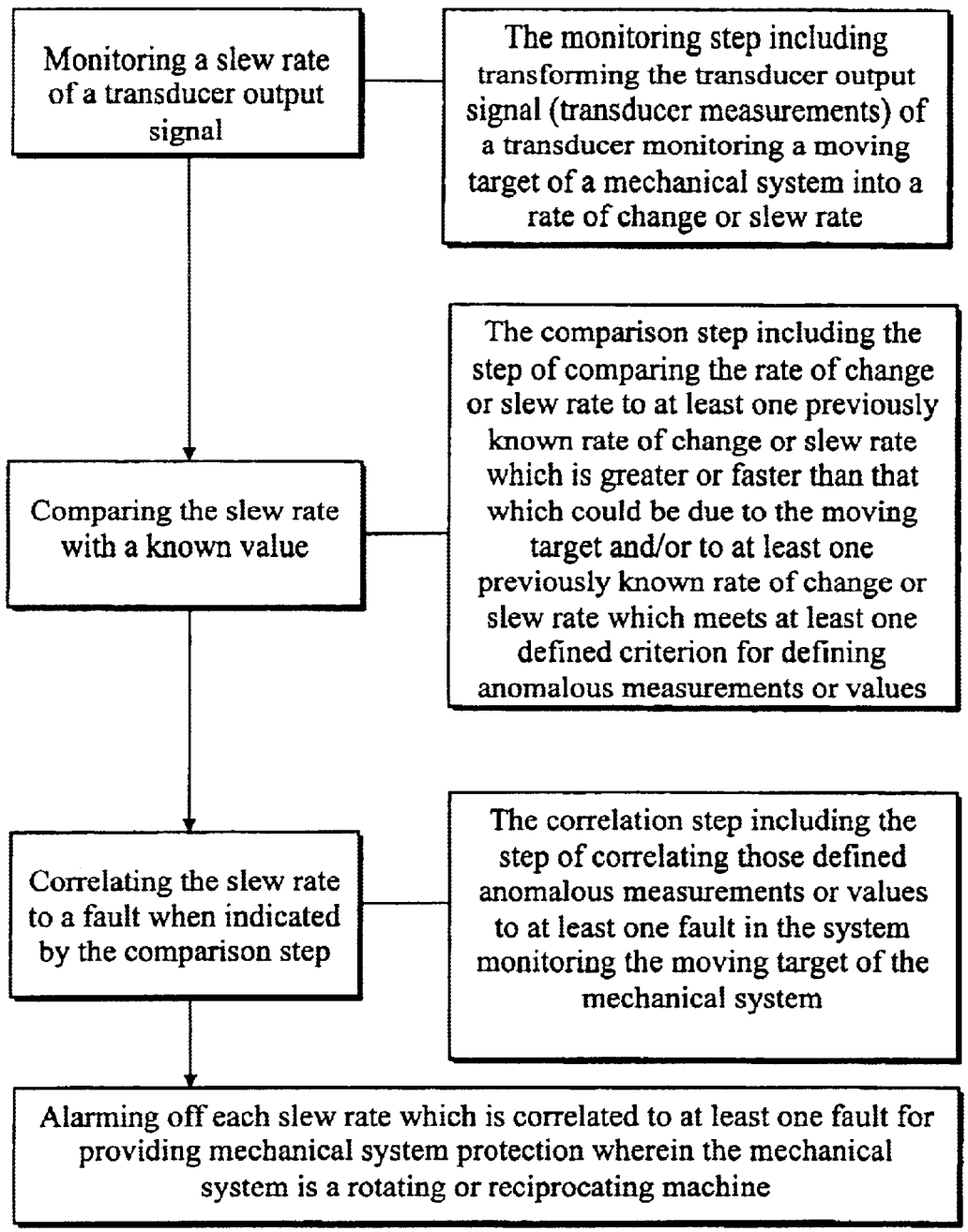
FIG. 2 is a general flowchart view of a slew rate measurement method of the transducer fault detection system.

Referring now to FIGS. 1 and 2, and in light of the above description, one method embodiment of the invention for detecting faults in a system monitoring a moving target includes the steps of: 1) monitoring a slew rate of a transducer output signal; 2) comparing the slew rate with a known value, and 3) correlating the slew rate to a fault when indicated by the comparison step.

In one particular form of the above method, the monitoring step includes the step of transforming the output signal (transducer measurements) of the transducer 20 monitoring the moving target T of the mechanical system M into rate of change or slew rate measurements or values 54, the comparison step includes the step of comparing the rate of change or slew rate measurements 54 to at least one previously known rate of change or slew rate value or measurement 62 which is greater or faster than that which could be due to the moving target T and/or to at least one previously known rate of change or slew rate value which meets at least one defined criterion for defining anomalous measurements or values, and the correlation step includes the step of correlating those determined or defined anomalous measurements or values to at least one fault 64 in the system 10 monitoring the moving target T of the mechanical system M. This particular method further includes the step of alarming off each slew rate measurement 54 which is correlated to at least one fault 64 for providing mechanical system protection wherein the mechanical system M can be a rotating or reciprocating machine.

Hence, in one embodiment of the invention, a transducer fault detection apparatus and method comprises: 1) at least one transducer outputting an electrical signal or transducer measurements correlative to movement of a target of a mechanical system being monitored by the transducer; 2) means, operatively coupled to the transducer, for transforming the transducer measurements into rate of change or slew rate measurements; 3) means for determining which, if any, of the slew rate measurements are faster than that which could be due to the moving target being monitored by the transducer, and 4) means for ascertaining whether or not any of the determined faster slew rate measurements are correlative to transducer faults for providing a means for censoring transducers for faults such as transducer defects, interconnect defects, interconnect wiring defects, or transducer power supply defects.

Figure 3:
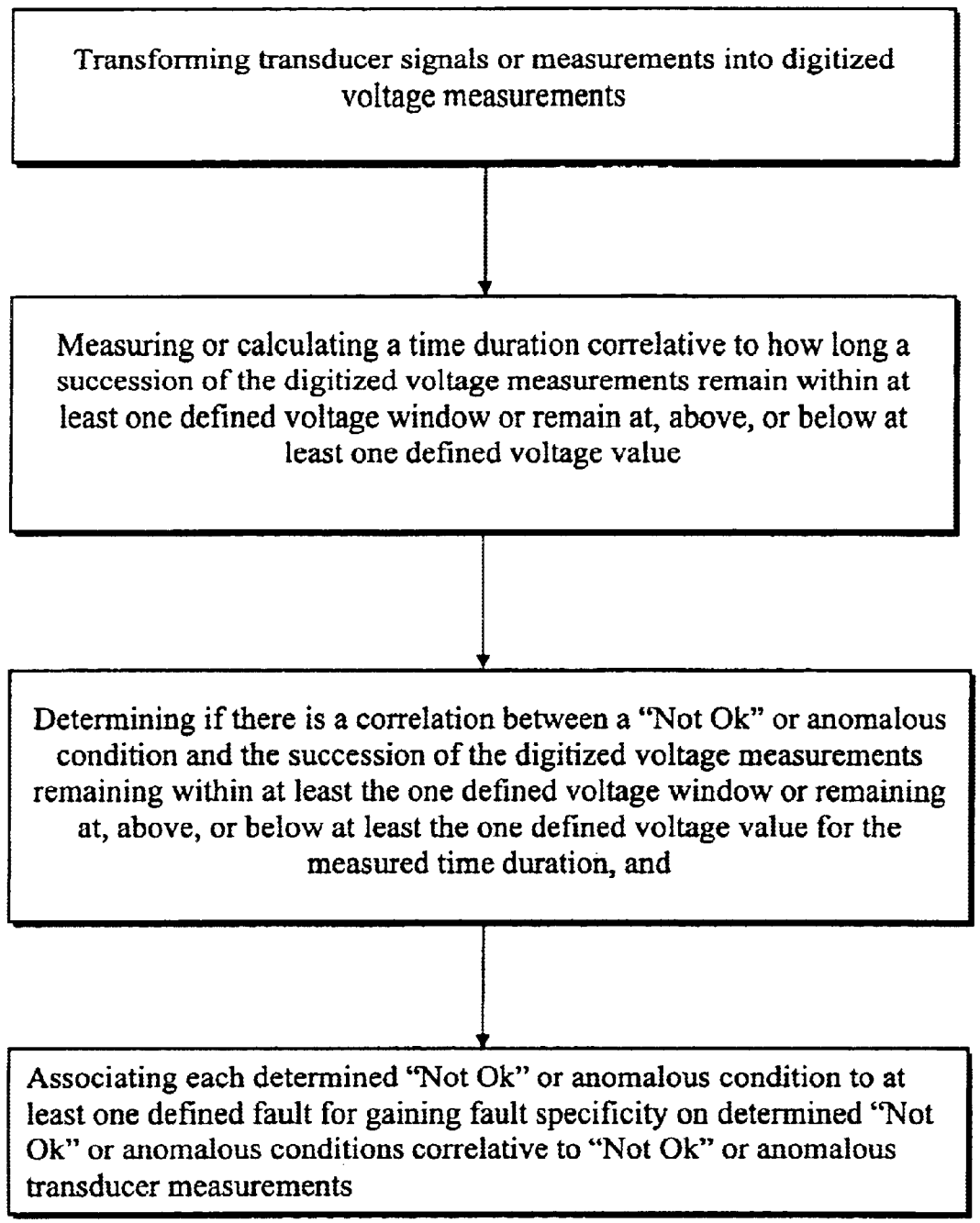
FIG. 3 is a general flowchart view of a voltage windowing and time duration measurement method of the transducer fault detection system.

Referring to FIGS. 1 and 3, and in light of the description hereinabove, another method embodiment of the invention for detecting faults in a system monitoring a moving target includes the steps of: 1) transforming transducer signals or measurements into digitized voltage measurements 52; 2) measuring or calculating a time duration 56 correlative to how long a succession of the digitized voltage measurements remain within at least one defined voltage window 66 or remain at, above, or below at least one defined voltage value 68; 3) determining if there is a correlation between a "Not Ok" or anomalous condition and the succession of the digitized voltage measurements remaining within at least the one defined voltage window 66 or remaining at, above, or below at least the one defined voltage value 68 for the measured time duration, and 4) associating each determined "Not Ok" or anomalous condition to at least one defined fault for gaining fault specificity on determined "Not Ok" or anomalous conditions correlative to "Not Ok" or anomalous transducer measurements. This method further includes the step of alarming off each "Not Ok" or anomalous condition which is associated to at least one fault 64 for providing mechanical system protection wherein the mechanical system M can be a rotating or reciprocating machine.

For the above method, the system 10 can employ at least the one transducer 20 for monitoring the target T of the mechanical system M by providing an electrical signal output correlative to target movement of the mechanical system; sampling means 30 for sampling the output of the transducer 20 preferably under the control of the processor 50 for transforming transducer signals or measurements into digitized voltage measurements 52. The processor 50, along with associated memory 60, provides the means for a) measuring or calculating a time duration 56 correlative to how long a succession of the digitized voltage measurements remain within at least one defined voltage window 66 or remain at, above, or below at least one defined voltage value 68; b) determining if there is a correlation between a "Not Ok" or anomalous condition and the succession of the digitized voltage measurements remaining within at least the one defined voltage window 66 or remaining at, above, or below at least the one defined voltage value 68 for the measured time duration, and 4) associating each determined "Not Ok" or anomalous condition to at least one defined fault 64 for gaining fault specificity on determined "Not Ok" or anomalous conditions correlative to "Not Ok" or anomalous transducer measurements. The determination and association steps can be accomplished by comparing the information obtained from the succession of the digitized voltage measurements along with the measured time duration in which the succession was sustained to defined voltage window values 66 or defined voltage values 68, and defined time values 70 stored in, for example, memory 60 and then correlating the results to particular transducer faults 64 or using the look up table 72 having defined voltage window or voltage values versus time associated with specific faults for gaining specificity on a "Not Ok" or anomalous transducer signal or measurement. The resulting information can be stored in memory 60, written to the events list 74, used to activate alarms, used to automatically shut down the machine M being monitored by the transducer and/or used to automatically annunciate machinery problems to operators and other plant personnel.

Thus, in one embodiment of the invention, a transducer fault detection apparatus and method comprises: 1) at least one transducer outputting an electrical signal correlative to movement of a target being monitored by the transducer; 2) measuring means, operatively coupled to the transducer, for digitally measuring values of the electrical signal and for measuring or calculating time durations in which a digitally measured value or range of digitally measured values are maintained; and 4) means for correlating the measured time duration of the digitally measured value or values to transducer faults for providing means for censoring transducers for faults such as transducer defects, interconnect defects, interconnect wiring defects, or transducer power supply defects.

Figure 4:
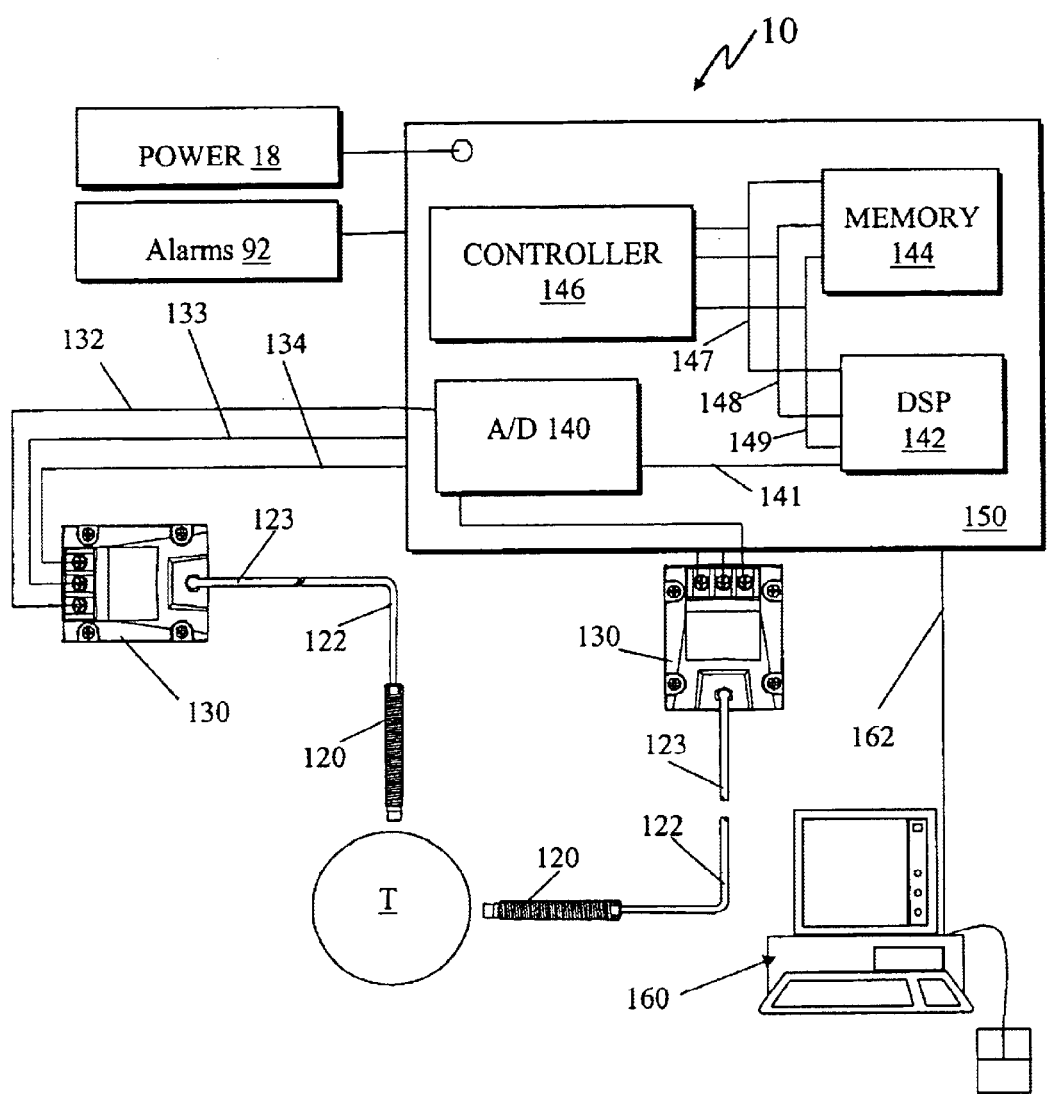
FIG. 4 is a functional block diagram of one specific example of the transducer fault detection system.

FIG. 4 shows a functional block diagram of one specific example of the transducer fault detection system 10. This specific example is comprised of at least one transducer 120 and in many environments two orthogonally disposed transducers 120 each operatively coupled to a signal conditioning means 130 via a cable 122 and an optional extension cable 123. The signal conditioning means 130 receive transducer output measurements or signals such as voltage signals correlative to static and dynamic distances between each transducer 120 and the target object T of the mechanical system M being monitored thereby. Transducers 120, cables 122, optional extension cables 123, and signal conditioning means 130 can be implemented by, for example, 7200 or 3300 Proximity Transducer Systems manufactured by Bently Nevada, LLC of Minden, Nev., USA.

In turn, the signal conditioning means 130, is operatively couple to a monitoring system 150 via connections 132 (in), 133 (COM), and 134 ($V_t$) for delivering conditioned output signals to the monitoring system 150 which are correlative to the static and dynamic distances between the transducers 120 and the target object T of the mechanical system M being monitored. The monitoring system 150 can be comprised of a sampling means 140 operatively coupled, via connection 141, to a digital signal processor (DSP) 142 which, in turn, is operatively coupled to an associated memory 144 and a microcontroller 146 via a data bus connection 147, an address bus connection 148, and a control line connection 149 as is well known to one of ordinary skill in the art, and informed by the present disclosure. The monitoring system 150 can be implemented by, for example, a 3300 or 3500 monitor or monitoring system also manufactured by Bently Nevada, LLC located in Minden, Nev. U.S.A. Additionally, the monitoring system 150 can be programmed via the microcontroller 146 to perform the transducer fault detection methods. Furthermore, the monitoring system 150 can be operatively coupled to computer 160 via connection 162 and can also be employed for processing means 50.

Hence, one aspect of the present invention is to censor a transducer or sensor for telling a user or customer more about the condition of the transducer or sensor itself. Particularly, some possible sensor faults were found by applicants to include loose or bad connectors including intermittents, bad field wiring (static opens & shorts), ground loops, field wiring routed in power trays, runout, wrong monitor configuration, clearance/target size, mismatched probe (i.e., transducer including connector) and an extension cable, component failure, water in transducer, connector/cable or conditioning circuit, wrong material, shorted winding, transducer mounting, open or shorted transducer and connector (including intermittents), and radio frequency interference.

Two largest areas of transducer or sensor faults were found by applicants to be bad field wiring and loose/bad connectors. Field wiring is defined as the connections, wiring or cables from the signal conditioning means 30, 130 to the processor 50 or monitor 150.

These types of faults are not always detected using conventional means and thus, one main problem before the present inventors was to figure out a way for detecting, inter alia, these faults. The applicants discovered that looking at slew rates of fault conditions can be of great value. More particularly, the inventors discovered, inter alia, transducer faults can be determined by measuring rates of change or slew rates of the electrical signal provided by the transducer and detecting or identifying each rate of change or slew rate measurement which has a measured rate of change or slew rate which is faster than that which could be due to a moving target for determining transducer faults such as a transducer defects, transducer power supply defects, defective interconnects, and defective interconnect wiring.

Specifically, and when using the system shown in FIG. 4, the applicants discovered that any extreme positive slew rate seen at the analog to digital converter 140 could be a valid target movement and any extreme negative slew rate seen at the analog to digital converter 140 is not. Applicants found that the maximum the DSP 142 in a 3300 monitor would see would be 1.6 V/usec when sampling at 64 kHz, having 15.625 micro seconds between samples, and having a max voltage swing representation out of the analog to digital converter 140 of 25 volts. In contrast, the applicants of the present application discovered that the maximum slew rate of the retreating target T using the same monitor 150 is only −0.4 V/usec.

Hence, applicants discovered that a maximum slew of a retreating target seen could be determined and used to key off such that anything over the maximum slew rate of a retreating target is not due to actual target movement and that negative slew rate values could be correlated to transducer faults some of which are shown in the table illustrated in FIG. 5 and which include: 1) a closed or opened signal conditioning circuit (prox) voltage connection 134; 2) a closed or opened signal conditioning circuit (prox) output connection 132; 3) a closed or opened signal conditioning circuit (prox) Com connection 133; 4) properly connecting a shorted signal conditioning circuit (prox) output connection 132; 5) properly connecting a shorted transducer 20,120 or transducer/connector connection (20, 22 and 120,122), or cable/extension cable connection 122, 123, or cable/ extension cable and signal conditioning connection; and 6) closing an opened transducer 20,120 or transducer/ connector connection (20,22 and 120,122), or cable/ extension cable connection 122, 123, or cable/extension cable and signal conditioning connection. Additionally, applicants discovered that these faults could be distinguished between if the condition remained static for over a period of consecutive samples (e.g., about ten consecutive samples). Furthermore, applicants also discovered that in the system shown in FIG. 4, the slew rates that are faster than 1.6 V/usec are mapped back into slower looking slew rates or are missed altogether and that slew rates cannot ever be mapped to look faster than they really are. Please see FIG. 5.

Moreover, applicants discovered that by looking at voltages being read by the sampling means 140 and the DSP 142 the following can be distinguished with respect to bad field wiring under static conditions: 1) opened voltage connection 134 (−$V_1$) or opened conditioning circuitry output connection 132 (prox out) has a 0.009 volts static measurement; 2) shorted conditioning circuitry output connection 132 (prox out) field wiring has a 0.002 volts static measurement; 3) opened common connection 133 (Com) has a −20.93 volts static measurement. Please see static values in table illustrated in FIG. 5.

Additionally, applicants discovered that by looking at voltages being read by the sampling means 140 and the DSP 142 the following can be distinguished with respect to Loose/Bad Connectors including intermittents under static conditions: 1) a statically opened or shorted connector will look like a statically opened or shorted transducer connection/cable or extension cable. A statically opened or shorted transducer conductor had a −0.46 volt static measurement when employing the 3300 Monitoring System manufactured by Bently Nevada, LLC. The −0.46 volt static measurement was found to be distinguishable from open or shorted field wiring when using the 3300 Monitoring System. An intermittent connection or connector, on the other hand, appears in different forms. Please see the table illustrated in FIG. 5.

Thus, in one aspect of the invention, a new, novel and useful transducer fault detection apparatus and method is provided for detecting anomalies in transducer output signals by using slew rate measurements.

In another aspect of the invention, a new, novel and useful transducer fault detection apparatus and method is provided for detecting anomalies in transducer output signals by using voltage window information in combination with time duration measurements of the information being maintained in the window for narrowing down causes of transducer faults and, in particular, intermittent faults.

In another aspect of the invention, a new, novel and useful transducer fault detection apparatus and method is provided for providing transducer censoring by detecting anomalies in transducer output signals by using the slew rate measurements and/or the voltage window information in combination with time duration measurements of the information being maintained in the window.

In another aspect of the invention, a new, novel and useful transducer fault detection apparatus and method is provided for detecting transducer faults by detecting anomalies in transducer output signals by measuring slew rates (changes in voltages versus changes in time) and comparing the measurements with at least one known or empirically determined slew rate value which is faster than that which could be due to a moving target being monitored by the transducer and then generating alarms based on the comparison step determining whether or not any of slew rate measurements are as fast or faster than the at least one known or empirically determined slew rate value and if the determined as fast or faster slew rate measurements are correlative to fault conditions.

In another aspect of the invention, a new, novel and useful transducer fault detection apparatus and method is provided for detecting transducer faults by detecting anomalies in transducer output signals by using voltage and time windowing measurements wherein information from a voltage window (e.g., information provided by a voltage measurement or measurements that exist in a limited or bounded voltage range or interval) is employed along with a time duration measurement or time window in which the information is sustained within the voltage window for determining causation of transducer faults and, in particular, intermittent faults.

In another aspect of the invention, a new, novel and useful transducer fault detection apparatus and method is provided for use with an asset monitoring system for use in monitoring assets such as rotating and reciprocating machinery.

These aspects demonstrate industrial applicability.

In use and in operation, and in one aspect, the transducer fault detection system 10 provides an improved "NOT OK" or anomalous detection scheme. One example of this detection scheme is illustrated in a flow chart shown in FIGS. 6 and 7. This example employs the information provided hereinabove including that which is found in the table illustrated in FIG. 5.

Figure 6:
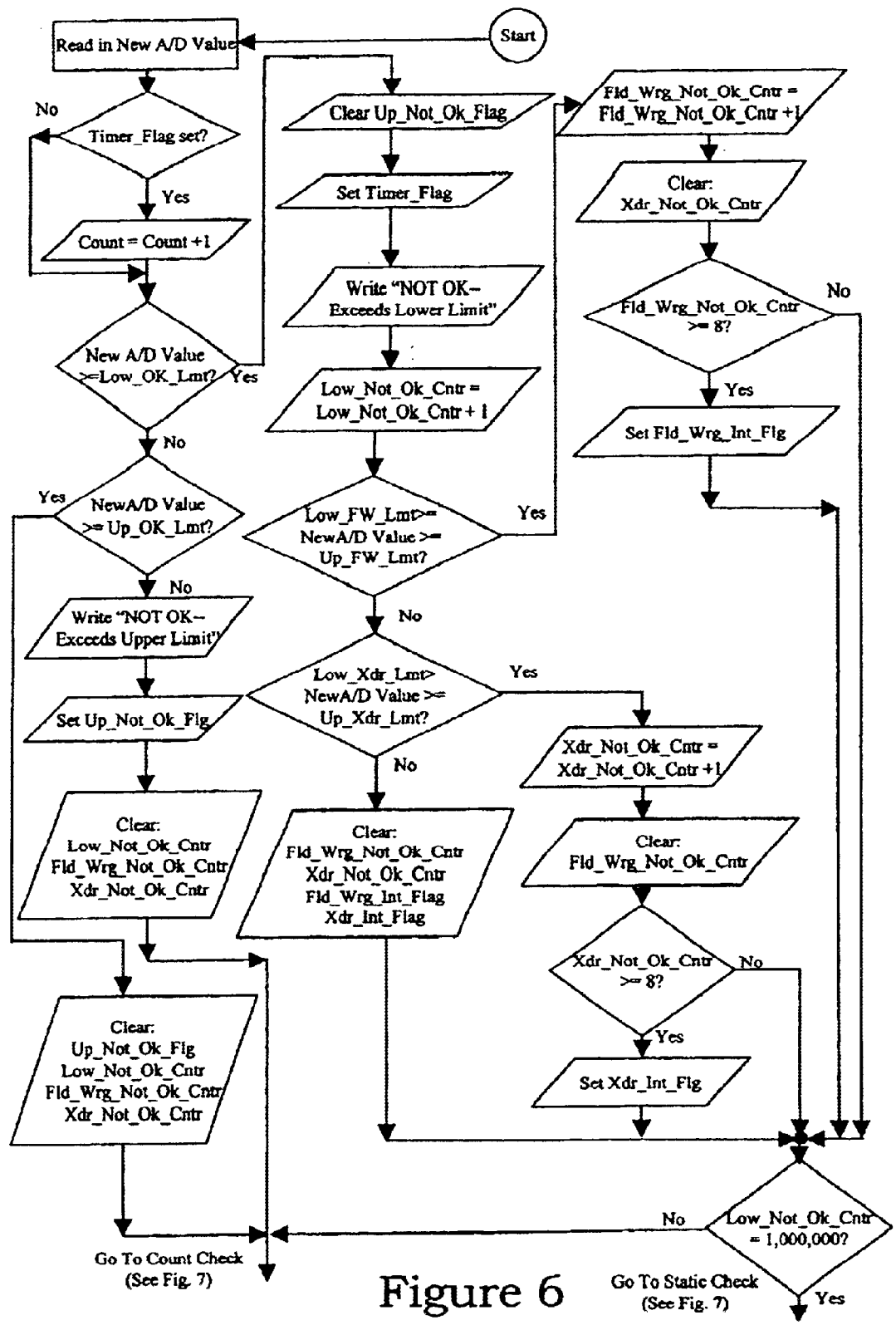
FIGS. 6 and 7 are one particular flowchart view of one specific use and operation of the transducer fault detection system pursuant to one example.
Figure 7:
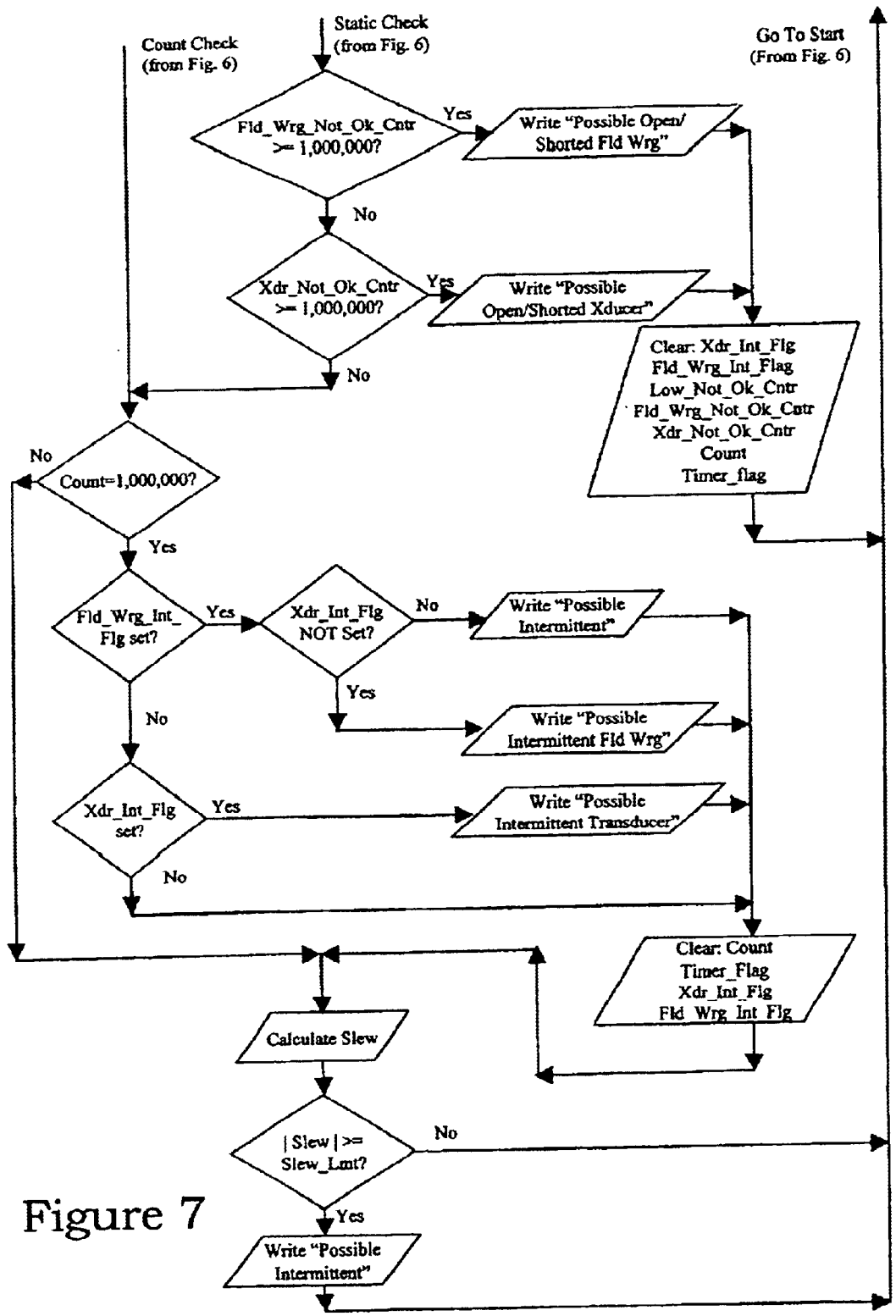

More specifically, and referring to FIGS. 6 and 7, a description of the variables shown therein are as follows wherein each variable is first delineated and is then followed by a brief description. 1) Timer_Flag: Flag to start count once gone NotOk; 2) Count: Counter; 3) Low_OK_Lmt: Lower Ok Limit set at −2.75 V; 4) Up_OK_Lmt: Upper Ok Limit set at −16.75 V; 5) Low_FW_Lmt: Lower Field Wiring Limit set at +0.2 V; 6) Up_FW_Lmt: Upper Field Wiring Limit set at −0.1 V; 7) Low_Xdr_Lmt: Lower Transducer Limit set at −0.1 V; 8) Up_Xdr_Lmt: Upper Transducer Limit set at −0.8 V; 9) Up_Not_Ok_Flg: Upper Not Ok Flag; 10) Low_Not_Ok_Cntr: Lower Not Ok Counter; 11) Fld_Wrg_Not_Ok_Cntr: Field Wiring Not Ok Counter, 12) Xdr_Not_Ok_Cntr: Transducer Not Ok Counter; 13) Fld_Wrg_Int_Flg: Field Wiring Intermittent Flag; 14) Xdr_Int_Flg: Transducer Intermittent Flag; 15) Slew: Calculated Slew; 16) Slew_Lmt: Slew Limit a negative 0.4 uV/sec. With these variables and descriptions in mind the flowchart illustrated in FIGS. 6 and 7 functions as follows:

1) If a transducer's or channel's (transducer and instrumentation hardware required to display its output signal) voltage level exceeds the lower Ok Limit (−2.75 V) it will be flagged. A "Not Ok—Exceeds Lower Limit" message will be written to the Alarm Events List 74. Note, a channel can be defined as the transducer and the instrumentation hardware required for displaying its output signal such as the transducer, connector, conditioning circuit, and monitor (sampling means and processor).

2) If a transducer's or channel's voltage level exceeds the upper Ok Limit (−16.75 V) it will be flagged. A "Not Ok—Exceeds Upper Limit" message will be written to the Alarm Events List.

3) If the transducer's or channel's slew rate is negative and its magnitude is greater than 0.4 uV/sec (based on two consecutive A/D inputs at the DSP) the transducer signal is invalid, not representative of real machine movement. The transducer or channel can be defeat, a "Not Ok—Slew Rate Exceeded" message can be written to the alarm events list, or the transducer or channel can be flagged as intermittent. An "Intermittent Detected" message can be placed in the system events list along with the value of the slew rate.

4) If a transducer's or channel's input is between +0.2 and −0.1 V for 1,000,000 A/D readings (15.625 seconds) it will be flagged as a possible field wiring fault condition. A "Possible Open or Shorted Field Wiring (Not Open COM)" message can be written to the system events list 74 along. This message is preferable only written once in a 24 hour period per transducer or channel.

5) If a transducer's or channel's input is between −0.1 and −0.8 V for 1,000,000 A/D readings (15.625 seconds) it can be flagged as a possible transducer fault condition. A "Possible Open or Shorted Transducer" message can be written to the system events list. This message is preferable only written once in a 24 hour period per transducer or channel.

6) If 15.625 seconds have passed since a transducer or channel exceeded the lower Not Ok limit, and a static fault (#4 or #5 above) is not detected, and there have been at least eight (8) consecutive readings between +0.2 and −0.1 V it can be flagged as a possible intermittent field wiring condition. A "Possible Intermittent Field Wiring" message can be written to the system events list. This message is preferable only written once in a 24 hour period per transducer or channel.

7) If 15.625 seconds have passed since a transducer or channel exceeded the lower Not Ok limit, and a static fault (#4 or #5 above) is not detected, and there have been at least eight (8) consecutive readings between −0.1 and −0.8 V it can be flagged as a possible intermittent transducer condition. A "Possible Intermittent Transducer" message can be written to the system events list. This message is preferable only written once in a 24 hour period per transducer or channel.

8) If a transducer's or channel's input is between −20.70 and −21.10 V for 1,000,000 A/D readings (15.625 seconds) it will be flagged as a possible field wiring fault condition. A "Possible Open COM on Field Wiring" message can be written to the system events list. This message is preferable only written once in a 24 hour period per transducer or channel.

9) If 15.625 seconds have passed since a transducer or channel exceeded the upper Not Ok limit, and a static fault (#8 above) is not detected, and there have been at least eight (8) consecutive readings between −20.70 and −20.10 V it can be flagged as a possible intermittent field wiring condition. A "Possible Intermittent COM on Field Wiring" message can be written to the system events list. This message is preferable only written once in a 24 hour period per transducer or channel.

Hence, in one embodiment of the invention, the transducer fault detection system 10 can embodied in a machinery protection system monitoring rotating and/or reciprocating machines or mechanical systems. In this embodiment, the system can be comprised of: 1) at least one transducer monitoring a target (e.g., a rotating shaft, roller element bearing, or a piston rod) of a mechanical system and providing an electrical signal output correlative to target movement of the mechanical system; 2) a conditioning means operatively coupled to the transducer for conditioning the electrical signal output; 3) a sampling means such as an analog to digital converter operatively coupled to the conditioning means for sampling and digitizing the conditioned electrical signal output; and 4) one or more processors and associated memory for providing: a) means for calculating a rate of change or slew rate from one sample to another (e.g., calculating the rate of change or slew rate of any two samples or one sample to its next consecutive sample) by taking a difference in amplitude or magnitude between one sample and another and dividing the difference by a period or increment of time it takes to go from one sample to another (e.g., a known sample rate) for transforming transducer measurements into rate of change or slew rate measurements; b) means for comparing the calculated rate of change or slew rate measurements to at least one known rate of change or known slew rate value for providing means for determining or detecting whether the rate of change or slew rate measurements are faster than that which could be due to the moving target being monitored by the transducer; and 3) means for correlating the determined faster rate of change or slew rate measurements to one or more transducer faults each characterized by having a measured rate of change or slew rate which is faster than that which could be due to the moving target of the mechanical system for providing means for censoring transducers for faults such as transducer defects, interconnect defects, interconnect wiring defects, or transducer power supply defects.

Additionally, any measurement which is determined to be faster than that which could be due to the moving target and meets at least one additional criterion such as being greater or less than a previously known or empirically determined rate of change or slew rate value can be, inter alia, correlated to one or more particular transducer fault, logged as an event, tagged, stored in a memory, used to generate an alarm and/or used to minimize the possibility of false alarms by defeating or not alarming off the transducer which has produced a measurement which is determined to be faster than that which could be due to the moving target and meets the at least one additional criterion (e.g., a user defined slew rate level or range which is known or empirically determined). Furthermore, the transducer fault detection system can be comprised of 1) means for digitally measuring values of the electrical signal and for measuring or calculating time durations in which a digitally measured value or range of values are maintained; and 2) means for correlating the measured duration of the digitally measured value or values to transducer faults for providing means for censoring transducers for faults such as transducer defects, interconnect defects, interconnect wiring defects, or transducer power supply defects.

Moreover, having thus described the invention, it should be apparent that numerous modifications and adaptations may be resorted to without departing from the scope and fair meaning of the present invention as set forth hereinabove and as described hereinbelow by the claims.

We claim:

1. A method for detecting faults from a transducer output signal, the steps including:

monitoring a slew rate of a transducer output signal;

comparing the slew rate with a known value; and correlating the slew rate to a fault when indicated by the comparison step.

2. The method of claim 1 wherein the monitoring step includes a step of transforming the output signal of the transducer monitoring a moving target of a mechanical system into slew rate measurements.

3. The method of claim 2 wherein the comparison step includes the step of comparing the slew rate measurements to at least one previously known slew rate value which is greater than that which could be due to the moving target.

4. The method of claim 3 wherein the correlation step includes the step of correlating those slew rate measurements which are greater than that which could he due to the moving target of the mechanical system to at least one fault in a transducer system monitoring the moving target of the mechanical system.

5. The method of claim 4 further including the step of alarming off each slew rate measurement which is correlated to said at least one fault for providing mechanical system protection.

6. The method of claim 4 wherein the mechanical system is a rotating or reciprocating machine.

7. A transducer fault detection device comprising, in combination:

at least one transducer outputting transducer measurements correlative to movement of a target of a mechanical system being monitored by said transducer;

means, operatively coupled to the transducer, for transforming the transducer measurements into slew rate measurements;

means for determining which, if any, of said slew rate measurements are faster than that which could be due to the moving target being monitored by said transducer; and means for ascertaining whether or not any of said determined faster slew rate measurements are correlative to transducer faults for providing fault detection.

8. The transducer fault detection device of claim 7 wherein said means for transforming the transducer measurements into slew rate measurements includes a sampling means for sampling and digitizing the transducer measurements and at least one processor for providing a means for calculating said slew rate measurements from said sampled and digitized transducer measurements for transforming the transducer measurements into said slew rate measurements.

9. The transducer fault detection device of claim 8 wherein said means for determining which, if any, of said slew rate measurements are faster than that which could be due to the moving target being monitored by said transducer includes means for comparing said slew rate measurements to at least one known slew rate value for determining which, if any, of said slew rate measurements are faster than that which could be due to the moving target being monitored by said transducer.

10. The transducer fault detection device of claim 9 wherein said means for ascertaining whether or not any of said determined faster slew rate measurements are correlative to transducer faults for providing fault detection includes means for correlating said determined faster slew rate measurements to one or more transducer faults each characterized by having a slew rate which is faster than that which could be due to the moving target of the mechanical system for providing means for censoring transducers for faults such as transducer defects, interconnect defects, interconnect wiring defects, or transducer power supply defects.

11. A method for detecting transducer faults, the steps including:

transforming transducer measurements made by a transducer monitoring a moving target of a mechanical system into slew rate measurements;

comparing the slew rate measurements to at least one previously known slew rate value which is known to be faster than that which could be due to the moving target of the mechanical system for determining which if any of the slew rate measurements are faster than the at least one previously known slew rate value; and correlating those slew rate measurements that are determined to be faster than the at least one previously known slew rate value to at least one transducer fault wherein each correlated slew rate measurement is characterized by having a faster slew rate than that which could be due to the moving target of the mechanical system.

12. The method of claim 11 further including a step of alarming off each slew rate measurement that is correlated to said at least one transducer fault for providing mechanical system protection.

13. The method of claim 12 wherein the mechanical system is a rotating or reciprocating machine.

14. A method for detecting faults from a transducer output signal, the steps including:

transforming transducer signals into digitized voltage measurements;

determining a time duration of how long a succession of the digitized voltage measurements remain within at least one defined voltage window;

determining if the succession of the digitized voltage measurements remaining within at least the one defined voltage window for the determined time duration is correlative to an anomalous condition, and associating each determined anomalous condition to at least one defined fault for gaining fault specificity for providing mechanical system protection.

15. The method of claim 14 further including a step of alarming off each anomalous condition that is associated to at least one, defined fault for providing mechanical system protection.

16. The method of claim 15 wherein a mechanical system is a rotating or reciprocating machine.

* * * * *